United States Patent [19]
Flory

[11] 3,879,948
[45] Apr. 29, 1975

[54] HYDRAULIC BOOSTER
[75] Inventor: Donald M. Flory, Arcanum, Ohio
[73] Assignee: General Motors Corporation, Detroit, Mich.
[22] Filed: June 12, 1974
[21] Appl. No.: 478,685

[52] U.S. Cl................................ 60/548; 90/431
[51] Int. Cl............................................ F15b 7/00
[58] Field of Search............ 60/548; 91/376 R, 391, 91/431, 434

[56] References Cited
UNITED STATES PATENTS

| | | |
|---|---|---|
| 2,544,042 | 3/1951 | Pontius ............................ 60/548 |
| 3,252,382 | 5/1966 | Kellogg et al..................... 91/434 |
| 3,353,451 | 11/1967 | Garrison et al................... 91/431 X |
| 3,526,089 | 9/1970 | Fulmer.............................. 91/431 X |
| 3,633,363 | 1/1972 | Larsen .............................. 60/548 X |

Primary Examiner—Martin P. Schwadron
Assistant Examiner—H. Burks, Sr.
Attorney, Agent, or Firm—D. D. McGraw

[57] ABSTRACT

A hydraulic brake booster is shown in a vehicle with the hydraulic pressure supply being the pump serving the power steering gear. The booster and the power steering gear are arranged in series and the booster is of the open center valve type. The control valve for the booster has one element formed on a reaction piston reciprocably mounted in the power piston and movable toward the valve closing direction by actuating pressure in the power chamber. The other valve element is mounted on an input member so that brake actuating movement of the input member causes a metering restriction of the hydraulic fluid flow between the valve elements with a consequent buildup of actuating pressure in the power chamber. The input member valve element is movable axially on the input member against a spring after the input member has been moved sufficiently far to close the control valve. The movement of the input member valve element operates an accumulator control valve which controls the admission of accumulator pressure to the power chamber for actuation after booster runout. The accumulator is maintained in a pressure charged state by action of the actuating pressure on the accumulator control valve, that pressure opening the valve to bring the accumulator charge pressure substantailly up to the level of the actuating pressure. The input member includes a balance piston having suitable areas operatively exposed to hydraulic fluid pressure and atmospheric pressure to prevent pressure buildup, due to actuation of the power steering gear, from affecting the brake booster operation, and to prevent an excessive reaction force on the input member.

3 Claims, 1 Drawing Figure

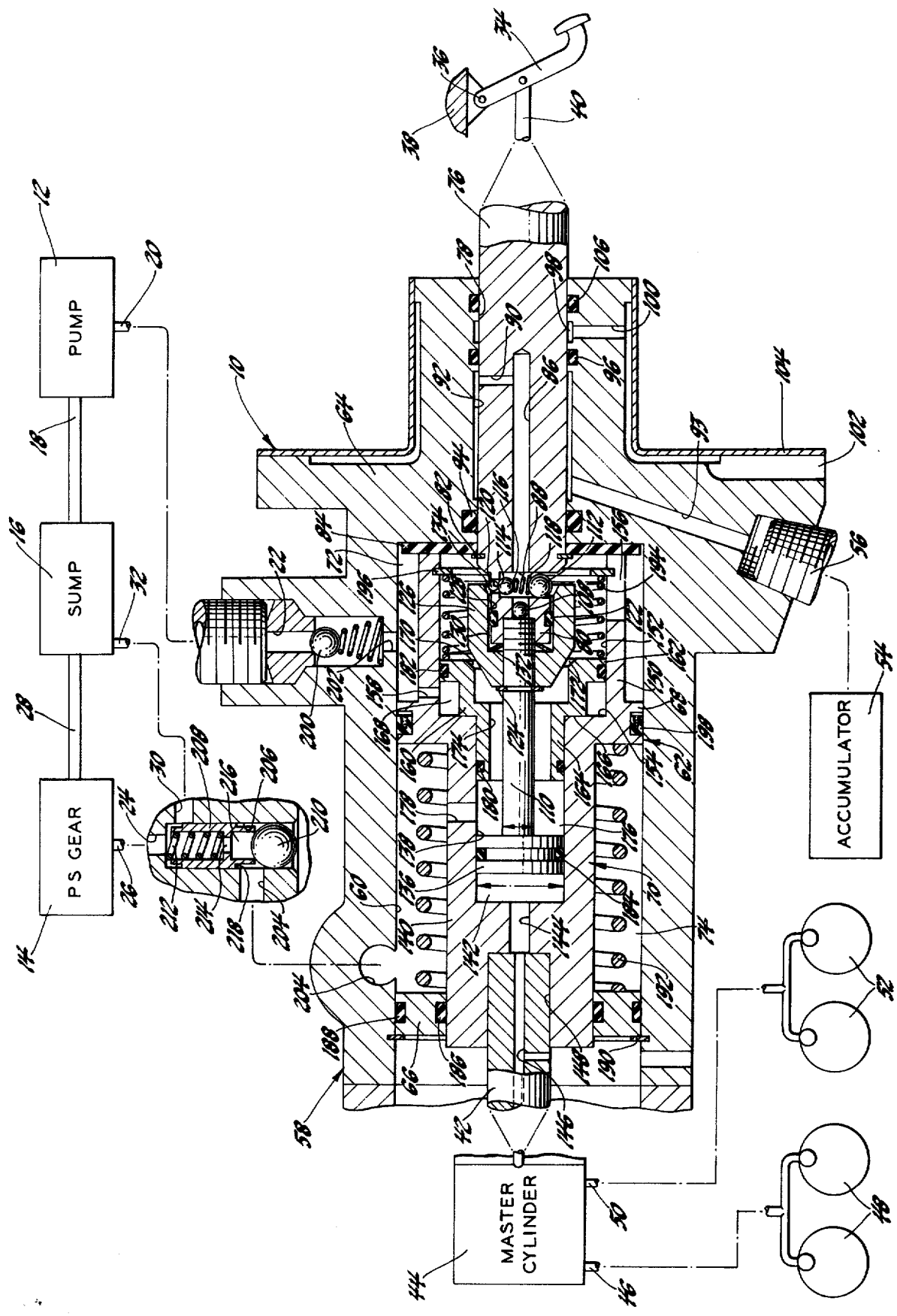

HYDRAULIC BOOSTER

The invention relates to a hydraulic booster assembly and more particularly to one of the open center type which is arranged to be positioned in series with a power steering gear and a hydraulic pump so that the booster is actuated by hydraulic fluid from the pump. The booster is particularly adapted to be positioned upstream of the power steering gear and has a balance piston arrangement which prevents power steering gear pressure buildup from adversely affecting the booster assembly.

It is a feature of the invention to provide a reaction piston mounted in the power piston of the booster and movable relative to the power piston under influence of brake actuating pressure so that in normal operation the reaction piston does not move as far axially as does the power piston. One valve element of the booster control valve is provided on the reaction piston and another valve element is provided on an input member. This arrangement has the effect of permitting the power piston to move axially a greater distance than the input member to obtain a desired amount of braking.

The input member valve element is mechanically engageable with the reaction piston valve element so that movement of the input member at booster runout will cause a 1:1 mechanical force transmitting path to be established between the input member and the power piston through the valve elements. The booster may thus be actuated manually when no additional power for booster operation is available.

It is another feature of the invention to so arrange the input member valve element that it moves axially through a restricted distance on the input member when force is initially transmitted through the mechanical force flow path so that it opens a valve connected to an accumulator. This valve amits accumulator pressure into the booster power chamber so that some power actuation may be attained until the accumulator pressure is no longer effective. Further movement of the input member will then result in a manual brake aply with the input member and the power piston moving the same relative distance.

It is another feature of the invention to so provide the accumulator valve within the input member so that it may be operated by the input member control valve element, and also exposing the accumulator valve to actuating pressure in the power chamber so that, when the pressure with which the accumulator is charged is substantially less than the actuating pressure in the power chamber, the accumulator valve is opened by the pressure differential and the accumulator is charged substantially to the level of the actuating pressure achieved. Upon a decrease in the actuating pressure the valve will close so that accumulator maintains the charge.

IN THE DRAWING

The single FIGURE is a cross section view, with parts broken away, illustrating somewhat schematically a brake booster assembly embodying the invention, together with a schematic illustration of the hydraulic power system for the assembly and the master cylinder and brake line systems for the front and rear brakes.

The booster assembly 10 embodying the invention is illustrated as being connected in a hydraulic power circuit in series with the power steering pump 12 and the power steering gear 14. A sump 16 provides a reservoir of hydraulic fluid for the system and is schematically represented as supplyingfluid to the pump 12 through conduit 18. The fluid flowing out of the pump 12 passes through conduit 20 to the inlet 22 of the booster assembly. The booster assembly outlet 24 is connected through conduit 26 to the power steering gear 14, which in turn is connected to sump 16 by conduit 28. A power steering gear bypass outlet 30 of the booster assembly 10 is directly connected to sump 16 through conduit 32.

The booster assembly 10 is schematically illustrated as being actuated by a brake pedal arm 34 suitably pivoted at 36 to a fixed portion 38 of the vehicle in which the booster assembly is installed. A push rod 40 is driven by pedal arm 34 when the brakes are applied. The output of the booster assembly includes an output push rod 42 which drives a master cylinder 44 to pressurize brake fluid in the front brake line 46 leading to front brakes 48 and the rear brake line 50 leading to the rear brakes 52. A hydraulic pressure accumulator 54 is connected to the booster assembly outlet 56. The manner in which the accumulator communicates with the remainder of the fluid system for charge and discharge is described below.

The booster assembly 10 includes a housing 58 in which a bore 60 is formed. This bore provides the cylinder wall for the power piston assembly 62, which is reciprocably received in bore 60. The bore has a rear end closure 64 and a forward end closure 66 so arranged that the center land 68 of the power piston 70, which is a part of power piston assembly 62, divides bore 60 into a power chamber 72 positioned in the rearward portion of the bore and an exhaust chamber 74 positioned in the forward portion of the bore.

An input member 76 is sealingly and slidably received through abore 78 formed in an extended portion of closure 64. The input member 76 is connected to be axially driven by the input push rod 40. The input member 76 has a reduced diameter extension 80 which extends into the power chamber 72. A stop 82 is provided on a portion of input member 76 within chamber 72 which engages bore closure 64 through the intermediate element 84. This element acts as a snubber or buffer for the input member 76 and for the power piston 70 when these members are in the rest position illustrated. An axially extending passage 86 is formed in input member 76 so as to intersect a cross passage 88 formed in a part of the extension 80 of the input member. A radial passage 90 in the input member 76 communicates the inner end of passage 86 with a portion of bore 78 in which an annular groove 92 is formed. This groove is in continuous fluid communication with outlet 56 through passage 93. Seals 94 and 96, positioned adjacent either side of groove 92, effectively seal this portion of the input member 76. Another annular groove 98, formed in bore 78 on the opposite side of seal 96 from groove 92, is connected to a vent passage 100 which leads to the atmospheric drain 102 defined by a drain recess formed in a portion of housing 58 and covered by the rear cover 104 of the booster. A seal 106 on the other side of groove 98 from seal 96 completes the sealing arrangement for the input member 76. The forward end of passage 86, which extends through extension 80, has a sealing ball 108 pressed therein, with the outer end portion of the passage being enlarged and threaded to receive a balance piston rod 110. Cross passage 88 has a sealing ball 112 in one end thereof and a port 114 in the other end thereof. This port provides a seat for the accumulator charge and release valve 116, which is retained against the valve seat by aspring 118. Valve 116 and spring 118 are received within passage 88 and constructed like a conventional check valve. However, the outer portion of port 114 receives a valve control ball 120 therein, this ball being sufficiently smaller than port 114 to allow hydraulic fluid to pass around it in that port at all times. An external seal 122 is provided about extension 80 axially forward of cross passage 88.

A stop 124 is provided on rod 110 forwardly of extension 80 so that the annular control valve element 126 is received on rod 110 and is permitted to move axially by a limited amount. Element 126 has a rearwardly opening recess 128 in which seal 122 is fitted. Extension 80 and the forward portion of recess 128 define a chamber 130 in which a spring 132 is mounted. This spring is illustrated as being a Belleville spring and acts to continuously urge element 126 toward stop 124. In the usual power operation of the booster assembly the element 126 remains in position against stop 124. However, as is described below, under certain conditions it compresses spring 132 and slides rearwardly on rod 110. The rear opening of recess 128 is beveled to provide a cam surface 134 which is positioned adjacent ball 120. Surface 134 is positioned radially outward of the ball 120 and sufficiently close thereto to prevent the ball from becoming dislodged from port 114 at any time. When the rearward movement of element 126 on rod 110 occurs, cam surface 134 forces ball 120 radially inward in port 114 so that the ball 120 engages the ball valve 116, establishing fluid communication between power chamber 72 and cross passage 88 through port 114. This is the arrangement by which accumulator pressure is released into power chamber 72 under certain conditions of operation.

The forward end of rod 110 is provided with a balance piston 136. This piston is sealingly and reciprocably mounted in a bore 138 formed in the reduced diameter forwardend 140 of power piston 70. Bore 138 is the same diameter as bore 78. The chamber 142 defined by balance piston 136 and the forward end of bore 138 is connected to atmospheric pressure through vent passage 144 in the power piston and vent passage 146 in the output push rod 42. These vent passages are in fluid communication due to the reception of output push rod 42 in a recess 148 at the forward end of the power piston, vent passage 144 opening into the recess 148 as does vent passage 146.

The power piston has a reduced diameter rear end 150 which extends rearwardly from land 68 into power chamber 72. A bore 152 extends through power piston rear end 150 and joins with bore 138. Bore 152 has a greater diameter than bore 138 and a shoulder 154 is therefore provided where the two bores meet. The extreme rear portion of power piston rear end 150 is castellated to provide passages 156 which establish continuous fluid communication between the outer portion of power chamber 72 located radially outward of piston rear end 150 and the inner portion of power chamber 72 defined by bore 152. A radially extending port 158, formed through a portion of power piston rear end 150 adjacent land 68, communicates the outer portion of power chamber 72 with the forward end of bore 152 at all times. An annular stepped reaction piston 160 is reciprocably received in the power piston with the rearwardly located outer flange 162 thereof being received in bore 152, the forward reduced diameter portion 164 being received in bore 138, and the shoulder 166 intermediate flange 162 and forward portion 164 being axially engageable with shoulder 154 of the power piston. Flange 162 is positioned axially rearward of shoulder 166 so that the forward portion of bore 152 defines a chamber 168 to which port 158 is connected at all times. A control valve seat 170 is formed on the rear inner diameter edge of flange 162, and is so arranged to cooperate with valve element 126 as to define a control valve 172. The reaction piston 60 has a sufficiently large stepped bore 174 therethrough so that rod 110 extends freely through piston 160 and the point of fluid restriction between bore 152 and bore 138 is provided by valve 172. The portion of bore 138 between balance piston 136 and the forward portion 164 of reaction piston 160 defines a chamber 176 which is in continuous fluid communication with exhaust chamber 74 through a radially extending port 178 formed in the power piston forward end 140. Suitable seals 180 and 182 are provided on the portions of reaction piston 160 fitting bores 138 and 152, and a suitable seal 184 is provided on balance piston 136 to seal against the cylinder wall of bore 138.

The closure 66 is illustrated as being an annular member having inner and outer seals 186 and 188 which respectively seal against the power piston forward end 140 and the cylinder wall defined by bore 60. Closure 66 is held in its axial position by retainer 190. A power piston return spring 192 is positioned in exhaust chamber 74 and seats against closure 66 and power piston land 68 to continuously urge the power piston toward the position shown in the drawing. The rear end of the power piston in engageable with element 84. A reaction piston spring 194 in bore 152 continuously urges the reaction piston forwardly toward shoulder-to-shoulder engagement with the power piston. Spring 194 reacts against spring retainer 196, which is provided in the rear portion of bore 152. A pressure seal 198 positioned in the outer periphery of land 68 maintains a seal between the land and the cylinder wall defined by bore 60 so that actuating pressure in the power chamber 72 cannot pass into exhaust chamber 74 around the outer periphery of the land.

The booster housing inlet 22 is connected through a check valve 200 to inlet port 202. This port opens into power chamber 72. An outlet port 204 is formed in housing 58 at the forward end of exhaust chamber 74 and communicates therewith. Outlet port 204 opens into a valve passage 206 in which a sleeve type valve 208 is reciprocably mounted. One end of passage 206 is closed by a sealing ball 210 which also acts as a valve seat for one reduced diameter end of valve 208. The other end of passage 206 communicates with outlet 24 and contains the valve spring 212, which continuously urges valve 208 into engagement with seat 210. Outlet 30 communicates with passage 206 on one side of the passage adjacent the end of the passage communicating with outlet 24. The valve has an interior passage 214 therethrough which connects outlet 24 with a valve chamber 216 contained within the reduced diameter portion of the valve adjacent seat 210. Passage 214 is a slight restriction which at normal pump flow rates will provide a slight back pressure in chamber 216. Spring 212 is a light spring and is easily overcome by pressure acting on the valve shoulder 218 so that the valve shifts upwardly as seen in the drawing to close outlet 30 relative to port 204 and outlet 24 and at the same time provide fluid communication between port 204 and outlet 24. The slight pressure created by the restrictive action of passage 214 is sufficient to normally hold the valve in this position. Thus hydraulic fluid passing through the booster assembly is normally conducted to and through the power steering gear 14. If there is no fluid flow permitted through the power steering gear due to the gear being in a full lock position, valve 208 is moved toward its seat 210 an amount sufficient to open outlet 30 and permit fluid flow out of the booster assembly through port 204, chamber 216, passage 214, and outlet 30.

In normal operation of the vehicle in which the booster assembly is installed, pump 12 is driven by the vehicle engine to provide fluid flow from sump 16 to the booster inlet 22. When flow from the pump begins, check valve 200 opens under very light fluid pressure and the fluid flow continues through port 202 and into power chamber 72. The valve 172 is in the position illustrated in the drawing and there is no effective restriction to fluid flow between the valve elements 126 and 170. Therefore, the flow continues without restriction through valve 172 and passage 174 into chamber 176. It then passes through port 178 and chamber 74 and out port 204. Valve 208 is moved upwardly, as seen in the drawing, under a light initial pressure acting on shoulder 218 and the flow continues from port 204 through valve passage 214 to outlet 24. It is then transmitted through conduit 26 and the open center type power steering gear 14, being returned to the sump 16 through the conduit 28.

When the power steering gear 14 is operated to steer the vehicle, a valve in the steering gear restricts the flow through the steering gera to cause a back pressure to be built up upstream of the steering gear through the booster assembly to the pump 12. This pressure will have no effect on the brake booster since the balance piston 136 has an effective area exposed tochamber 176 which is equal to the effective area of input member 76 and the pressure is balanced about pistons 70 and 160. When the power steering gear is returned to center position, the pressure throughout the booster assembly merely decreases. If the power steering gear is operated to its maximum extent so that the steering mechanism is in a left or right lock position, no substantial fluid flow can take place through the power steering gear. At this point the back pressure acting across valve 208 is no longer subject to any restriction of passage 214 since there is virtually no flow. The valve 208 is therefore moved by spring 212 toward the position shown in the drawing, relieving the blockage to flow by opening outlet 30. Valve 208 assumes an effective intermediate position so that it does not remain seated on seat 210 nor does it keep outlet 30 closed off. Thus some flow can be maintained through the booster assembly so that the brake booster may be operated as necessary.

When the vehicle brakes are to be applied under normal operating conditions, the operator moves brake pedal arm 34 pivotally about pivot 36 so that push rod 40 moves input member 76 axially leftward as seen in the drawing. This causes valve element 126 to approach valve seat 170, restricting the fluid flow through valve 172 and causing a back pressure, which is the actuating pressure, to be built-up in power chamber 72. This pressure is found in chamber 168 because of the connection of port 158, in bore 152 because of passages 156, and also acts on the accumulator charging valve 116. The pressure is exerted across the effective area of power piston 70 exposed to chamber 72, moving the power piston against the force of return spring 192 in an axial direction toward master cylinder 44. The force moving the power piston is transmitted through the output push rod 42 to the master cylinder, which in turn pressurizes brake lines 46 and 50 to energize the front brakes 48 and rear brakes 52. The pressure also acts against an effective reaction area on reaction piston 160 defined by the difference between the area of valve 172 and the area of bore 138, urging the reaction piston rightwardly against spring 194 relative to power piston 70. The effect of this relative movement is to cause the power piston 70 to move leftwardly further than valve seat 170 does, therefore requiring less input member axial movement than the amount of output movement of the power piston 70. This provides a greater than 1:1 ratio actuation so that smaller amounts of brake pedal movement result in larger amounts of movement of the output push rod 42. The ratio is determined by the effective reaction area on reaction piston 160 and the spring contact of spring 194.

The accumulator 54 is normally hydraulically charged at some pressure. When the brake is actuated to generate pressure in power chamber 72, and this pressure is sufficient to overcome the accumulator pressure acting on valve 116 and the very light force of the spring 118, valve 116 moves to open port 114 and allow the greater actuating pressure to be transmitted to the accumulator 54. The accumulator will therefore be charged substantially to the actuating pressure. The same type of action occurs if the power steering gear operation causes sufficient pressure to exist in chamber 72 to open valve 116. When the pressure in chamber 72 then decreases as the brake or power gear is released, valve 116 closes, trapping the pressure in accumulator 54. Therefore the accumulator is continuosly maintained with a charge pressure substantially equal to the highest pressure obtained in chamber 72, and each time that the brake or power steering gear is actuated the valve 116 compares this pressure and allows the accumulator charging pressure to be increased if it is less than the chamber pressure.

If the pump 12 is not operational, it may become necessary to operate the brake booster by using the accumulator pressure. When the brake pedal arm 34 is moved in the brake applying direction under such a condition, the input member 76 moves leftwardly as seen in the drawing until the control valve element 126 engages the valve seat 170. The control valve element 126 is then prevented from further leftward movement because reaction piston 160 has its shoulder 166 engaging the shoulder 154 of the power piston 70 and the return spring 192 is sufficiently stronger than spring 132 so that spring 132 yields with further movement of the input member 76. This moves ball 120 into camming engagement with cam surface 134, causing the ball to move into port 114 until it forces valve 116 open. The accumulator pressure will then be released past valve 116 through port 114 into power chamber 72, the amount of such pressure being modulated by the amount of opening of valve 116. Since valve 172 is closed, and check valve 200 closes due to the greater pressure being on the side thereof connected with power chamber 72, the accumulator pressure acts on fluid in the closed power chamber to move power piston 70 leftwardly to actuate the master cylinder. This movement of the power piston is at a 1:1 ratio with movement of the input member since the valve 116 and the cam surface 134 move with the input member and the power piston. When the brake pedal arm 34 is released, the input member 76 immediately moves rightwardly relative to the control valve element 126, and valve 116 closes. The pressure in power chamber 72 continues to react on input member 76, moving it further rightwardly until valve 172 is opened. The pressure in power chamber 72 is then exhausted through valve 172 into exhaust chamber 74.

When there is no accumulator pressure remaining to actuate the brake, the master cylinder 44 is manually actuated at a 1:1 ratio by the establishment of a mechanical force flow path from the input member 76 through valve element 126, valve seat 170, shoulders 166 and 154, power piston 70, and output push rod 42. This is a relatively higher mechanical advantage than that which occurs under normal power operation when the power piston moves a greater distance than the input member. If booster runout occurs and more braking is needed, manual force is mechanically added to the booster force in a similar manner.

What is claimed is:

1. A hydraulic brake booster assembly comprising:

a power piston movable in a cylinder bore with a power chamber at one end thereof;

an open center control valve including a hydraulic reaction valve seat member and a movable resiliently mounted valve member cooperating with said valve seat member to define the control valve, said control valve normally having hydraulic fluid flowing therethrough;

said power piston providing mounting means receiving said hydraulic reaction valve member for reciprocal movement relative to said power piston, said hydraulic reaction valve seat member being urged in the control valve opening direction by yieldable means acting between said power piston and said hydraulic reaction valve seat member, and being urged in the control valve closing direction by fluid pressure in said power chamber, whereby pressure increase in said power chamber causes said power piston to move in the cylinder bore a greater distance than the movement of said valve member in the same direction which caused the pressure increase in said power chamber by restricting fluid flow through said control valve;

an input member providing mounting means receiving said resiliently mounted valve member, and movable to control the restrictive action of said control valve to control the power pressure in said power chamber and thereby control the power output of the booster assembly, said input member having accumulator charge and release passage means therein and valve means controlling the fluid communication of said passage means with said power chamber, said valve means opening to increase fluid pressure in said accumulator charge and release passage means at a predetermined pressure differential between said passage means and said power chamber so as to pressure charge an accumulator connected to said passage means, said valve means being opened by the action of movement of said valve member on said input member against the resilient mounting thereof to release fluid pressure in said passage means into said power chamber, said valve member having contacted said valve seat member and closed said control valve.

2. A hydraulic booster assembly having an input member and an output member and a power piston reciprocably mounted in a cylinder bore with a power chamber at one end thereof;

an open center valve assembly for controlling the pressure in the power chamber actuating the power piston, said valve assembly including a first valve member reciprocably mounted on said power piston and urged in a relative valve opening direction by a spring and having an effective differential area responsive to actuating pressure in said power chamber urging the first valve member toward a relative valve closing direction, and a second valve member reciprocably mounted for limited axial movement on said input member and positioned in valving relation with said first valve member and urged against a stop on said input member in a relative valve closing direction by another spring and also by actuating pressure in the power chamber;

a balance piston reciprocably received in cylinder bore formed in said power piston and secured to said input member and having one side exposed to atmospheric pressure and the other side exposed to hydraulic fluid pressure downstream of said open center valve assembly with the differential pressure acting thereon to balance said input member and said second valve member against pressure changes occurring in the hydraulic actuating fluid downstream of said valve members;

and accumulator charge and release valve means responsive to hydraulic fluid pressure upstream of said valve members so as to open when that pressure exceeds the pressure charge of an accumulator connected therewith, said valve means being positioned in relation to said second valve member so that movement of said second valve member, in opposition to the spring acting thereon and in response to closure of said valve members followed by further brake apply movement of said input member, opens said valve means to admit accumulator pressure upstream of said valve members to actuate said power piston by introducing accumulator pressure into said power chamber.

3. A hydraulic brake booster comprising:

a housing having a bore formed therein, a fluid inlet port communicating with one end of said bore, a fluid outlet port communicating with the other end of said bore, and closures for said bore ends;

a power piston assembly reciprocably received in said bore so as to define therewith a power chamber at said one bore end and an exhaust chamber at said other bore end, said power piston having a reduced diameter forward end sealingly and movably extending through an aperture formed in the one of said closures closing said other bore end, a reduced diameter rear end in said power chamber, and a stepped bore with first and second power piston bore sections respectively formed in said forward and rear piston ends and separated by a shoulder, said second power piston bore section having a larger diameter than said first power piston bore section and forming a part of said power chamber;

an annular stepped reaction piston reciprocably and sealingly received in said first and second power piston bore sections, a spring, said reaction piston having a shoulde urged toward abutting relation with said power piston shoulder by said spring, an annular valve seat formed on said reaction piston with an effective diameter greater than said first power piston bore section by an amount establishing a reaction area subject to power chamber pressure and acting in opposition to said spring;

an input member assembly including a push rod extending through a bore formed in the other of said closures and having a reduced diameter forward end positioned in said power chamber, a balance piston reciprocably and sealingly received in said first power piston bore section forward of said reaction piston and having a rod extending freely through said reaction piston and secured to said push rod reduced diameter forward end and having a stop thereon in axially spaced relation to said push rod reduced diameter forward end, an annular control valve having an external valve face and a rearwardly opening recess and slidably mounted on said balance piston rod axially intermediate said stop and said push rod reduced diameter forward end with said push rod reduced diameter forward end being sealingly and reciprocably received in said rearwardly opening recess, said valve face being in valving relation with said valve seat, the forward end of said rearwardly opening recess co-operating with said balance piston rod and said push rod reduced diameter forward end to define a chamber having a spring therein urging said control valve against said stop;

and an output push rod connected in force transmitting relation with said power piston forward end and adapted to connect with a master cylinder assembly in operative relation;

said piston forward end having a first port therein connecting the end of said first piston bore section on the opposite side of said balance piston from said reaction piston with atmospheric pressure and a second port therein connecting the portion of said first power piston bore section intermediate said balance piston and said reaction piston with said exhaust chamber, a meterable flow path being established from said fluid inlet port into said power chamber, through the metering valve formed by said annular control valve and said valve seat, through said annular reaction piston into said portion of said first power piston bore section intermediate said balance piston and said reaction piston, through said second port into said exhaust chamber, and out of said exhaust chamber through said fluid outlet port.

* * * * *